July 6, 1954     G. A. LYON     2,682,937
AIR-COOLED WHEEL STRUCTURE
Filed Feb. 1, 1952
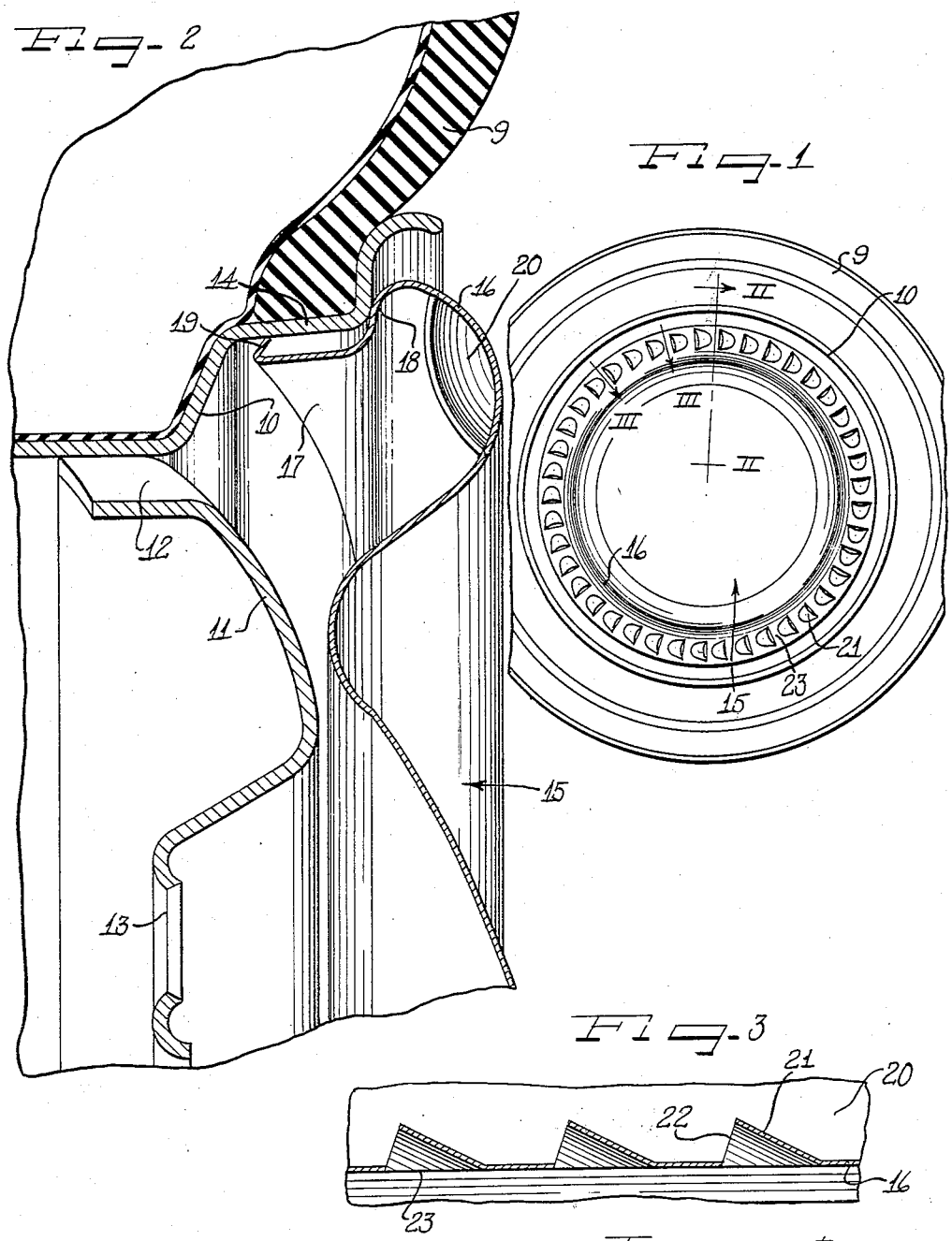
Inventor
George Albert Lyon

Patented July 6, 1954

2,682,937

UNITED STATES PATENT OFFICE 2,682,937

AIR-COOLED WHEEL STRUCTURE

George Albert Lyon, Detroit, Mich.

Application February 1, 1952, Serial No. 269,391

5 Claims. (Cl. 188—264)

This invention relates to a wheel cover and more particularly to an automobile wheel cover provided with means for assisting in the circulation of air through the wheel.

An object of this invention is to provide a simple, one piece cover with integral cover retaining means and air circulating scoops.

Another object of this invention is to provide a wheel cover with a bulge from which scoops can be formed and which bulge can also be used as a bottoming shoulder for engagement with the wheel.

In accordance with the general features of this invention there is provided in a circular wheel cover an annular axially outward bulge and a series of circumferentially spaced air scoops depressed from and rearwardly into the interior of the bulge.

Another feature of the invention relates to forming the outer periphery of the bulge into a wheel engaging shoulder which terminates in circumferentially spaced integral axially rearwardly projecting wheel engaging resilient retaining fingers.

Other objects and features of this invention will more fully appear from the following detailed description taken in connection with the accompanying drawings which illustrate a single embodiment thereof and in which:

Figure 1 is a fragmentary side view of a wheel provided with a cover embodying the features of this invention;

Figure 2 is an enlarged fragmentary cross-sectional view taken on the line II—II of Figure 1; and Figure 3 is an enlarged fragmentary sectional view taken on substantially the line III—III of Figure 1 looking in the direction indicated by the arrows.

As shown on the drawings:

In the drawing I show more or less a conventional type of automobile wheel which includes pneumatic tire and tube assembly 9 carried in the usual way by a multi-flanged drop center type of tire rim 10. This tire rim 10 is secured at spaced intervals to a dished metallic wheel body 11 which between the points of fastening to the rim has air openings 12 through which air can circulate to assist in cooling the usual brake drum (not shown). The central part of the dished body 11 has a bolt on flange 13 by means of which the wheel may be detachably secured in the usual way by cap screws or bolts (not shown) to the brake drum or the like on the vehicle axle.

Cooperating with this wheel is a detachable wheel cover designated generally by the reference character 15, which embodies the features of this invention. This wheel cover may be made in any suitable manner although excellent results may be accomplished by stamping it from metallic sheets such, for example, as stainless steel sheet or coil stock. It is intended to have a high lustrous finish so as to enhance the exterior appearance of the automobile wheel.

The cover 15 at its outer peripheral margin includes an annular bulge 16 which terminates in a series of axially rearwardly projecting and circumferentially spaced retaining fingers 17 connected to the bulge by a generally radially extending shoulder 18 adapted to bottom against the tire rim 10.

The fingers 17 may be of any suitable number and each has a radially and axially outwardly inclined short extremity 19 adapted to have gripping engagement with a flange 14 of the rim to the rear of the point of engagement of this flange by the cover shoulder 18.

The fingers 17 are necessarily resilient and normally have the edges of their extremities 19 in a circle of a larger diameter than the surface of the flange 14 to be engaged so that said fingers are resiliently cammed radially inwardly upon engagement with the rim flange 14 as the cover is pressed home onto the wheel.

Now it will be noted from Figure 2 that the annular bulge 16 projects both radially and axially outwardly beyond the fingers 17 and that it defines on its interior an annular cavity 20 in which air is adapted to circulate through scoops 21 pressed rearwardly from the bulge 16 into the cavity 20. These scoops (Figures 1 and 3) are spaced from each other in a circumferential direction and are each of a wedge-like cross-section (Figure 3). Also each scoop 21 has an opening 22 facing in the direction of the forward movement of the wheel so that air may freely travel through the same. In addition to providing for the circulation of air through the cover, these scoops also enable the cover to have a highly ornamental appearance, as shown in Figure 1, and yet at the same time do not provide any sharp surfaces against which one could cut his or her hand in applying the cover to the wheel.

The cover is easily removable from the wheel by simply inserting a screw-driver under the shoulder 18 and forcibly ejecting the cover from its retained cooperation with the wheel.

It will be noted that the shoulder portion 18 of the bulge 16 not only serves as a bottoming shoulder for the cover against the wheel but also serves as a stiffening means against which the fingers flex. In reality the shoulder 18 can slightly yield with the fingers in the application and removal of the cover.

In addition, the scoops 21, being located in the outermost periphery of the wheel cover, are in a position to receive most effectively air in the rotation of the wheel.

I claim as my invention:

1. In a covered structure for a wheel including a flanged tire rim, a circular wheel cover having its outer peripheral margin provided with axially rearwardly projecting circumferentially spaced cover retaining fingers engageable with said flanged tire rim, said cover margin having an annular radially and axially outwardly projecting circular bulge beyond said fingers and defining on the rear side of said cover an annular air receiving pocket, said bulge having a series of scoops projecting into the interior of said pocket for assisting in the circulation of air transversely thru the wheel.

2. In a covered structure for a wheel including a flanged tire rim, a circular wheel cover having its outer peripheral margin provided with axially rearwardly projecting circumferentially spaced cover retaining fingers engageable with said flanged tire rim, said cover margin having an annular radially and axially outwardly projecting circular bulge beyond said fingers and defining on the rear side of said cover an annular air receiving pocket, said bulge having a series of scoops projecting into the interior of said pocket for assisting in the circulation of air transversely thru the wheel, each of said scoops extending from said bulge in wedge shaped form with the widest portion of said wedge form opening in a circumferential direction.

3. In a covered structure for a wheel including a flanged tire rim, a circular wheel cover having its outer peripheral margin provided with axially rearwardly projecting circumferentially spaced cover retaining fingers engageable with said flanged tire rim, said cover margin having an annular radially and axially outwardly projecting circular bulge beyond said fingers and defining on the rear side of said cover an annular air receiving pocket, said bulge having a series of scoops projecting into the interior of said pocket for assisting in the circulation of air transversely thru the wheel, said bulge defining a shoulder beyond said fingers for bottoming against said rim.

4. In a circular wheel cover, an annular axially outward bulge and a series of circumferentially spaced air scoops depressed from and rearwardly into the interior of said bulge.

5. In a circular wheel cover, an annular axially outward bulge and a series of circumferentially spaced air scoops depressed from and rearwardly into the interior of said bulge, the outer perihpery of said bulge being formed into a wheel engaging shoulder and terminating in circumferentially spaced integral axially rearwardly projecting wheel engaging resilient retaining fingers.

References Cited in the file of this patent

UNITED STATES PATENTS

| Number | Name | Date |
|---|---|---|
| 1,665,437 | Booth | Apr. 10, 1928 |
| 2,022,174 | Allee | Nov. 26, 1935 |
| 2,109,722 | Fawick | Mar. 1, 1938 |
| 2,143,950 | Kliesrath | Jan. 17, 1939 |
| 2,331,259 | Whitten | Oct. 5, 1943 |
| 2,433,854 | Lyon | Jan. 6, 1948 |